US008498666B2

(12) United States Patent
Sebire et al.

(10) Patent No.: US 8,498,666 B2
(45) Date of Patent: Jul. 30, 2013

(54) CARRIER AGGREGATION FOR TWO RADIO SYSTEMS

(75) Inventors: Benoist P. Sebire, Tokyo (JP); Antti A. Toskala, Espoo (FI); Karri M. Ranta-Aho, Atlanta, GA (US); Harri Holma, Helsinki (FI); Timo E. Lunttila, Espoo (FI)

(73) Assignee: Nokia Siemens Networks Oy, Espoo (FI)

( * ) Notice: Subject to any disclaimer, the term of this patent is extended or adjusted under 35 U.S.C. 154(b) by 430 days.

(21) Appl. No.: 12/774,306

(22) Filed: May 5, 2010

(65) Prior Publication Data

US 2011/0275359 A1 Nov. 10, 2011

(51) Int. Cl.
*H04M 1/00* (2006.01)
(52) U.S. Cl.
USPC ......... 455/552.1; 455/445; 455/428; 370/351
(58) Field of Classification Search
USPC ............ 455/552.1, 17, 59, 179.1, 103, 422.1, 455/464, 509, 550.1, 445, 428; 370/302, 370/328, 329, 338, 341, 344, 431, 480, 310, 370/351
See application file for complete search history.

(56) References Cited

U.S. PATENT DOCUMENTS

| | | | |
|---|---|---|---|
| 6,470,182 B1* | 10/2002 | Nelson ....................... | 455/432.1 |
| 2002/0158801 A1* | 10/2002 | Crilly et al. .................... | 342/378 |
| 2006/0095962 A1* | 5/2006 | Lioy et al. ....................... | 726/21 |
| 2008/0040179 A1 | 2/2008 | Masermann et al. ............. | 705/8 |
| 2009/0064231 A1* | 3/2009 | Butcher ........................... | 725/56 |
| 2010/0151867 A1* | 6/2010 | Tran et al. ..................... | 455/445 |
| 2010/0260130 A1* | 10/2010 | Earnshaw et al. ............ | 370/329 |
| 2011/0064035 A1* | 3/2011 | Guerreiro et al. ............ | 370/329 |

FOREIGN PATENT DOCUMENTS

| | | |
|---|---|---|
| EP | 2 073 397 A1 | 6/2009 |
| WO | WO-2009/093891 A1 | 7/2009 |

OTHER PUBLICATIONS

Hill (Open Systems Interconnection Reference Model, Oct. 2008) http://hill2dot0.com/wiki/index.php?title=OSI_Reference_Model.*
"Resource Allocation Considerations for Multi-Carrier LTE-Advanced Systems Operating in Backward Compatible Mode", Y. Wang, K.I. Pedersen, P.E. Mogensen, and T. B. Sorensen, in Proc. IEEE PIMRC, Sep. 2009, 5 pgs.
"Architecture Providing Multi-System Carrier Aggregation", U.S. Appl. No. 12/630,257, filed Dec. 3, 2009, 48 pgs.

* cited by examiner

*Primary Examiner* — Kamran Afshar
*Assistant Examiner* — Marisol Fahnert
(74) *Attorney, Agent, or Firm* — Harrington & Smith

(57) ABSTRACT

A method includes enabling interoperability between different types of wireless communication systems operating with different types of air interfaces to provide downlink radio resource aggregation for a user equipment. Enabling includes establishing a first connection between a medium access control (MAC) protocol layer of a first wireless communication system and a physical layer of the first wireless communication system; establishing a second connection between the MAC protocol layer of the first wireless communication system and a MAC protocol layer of a second wireless communication system; using the first connection, performing wireless communications with the user equipment via one or more component carriers over a first air interface of the first wireless communication system; and communicating data over the second connection, the data used in wireless communications via one or more component carriers over a second air interface of the second wireless communication system. Apparatus and program products are also disclosed.

20 Claims, 9 Drawing Sheets

CARRIER AGGREGATION FOR TWO RADIO SYSTEMS

TECHNICAL FIELD

This invention relates generally to radio frequency (RF) reception and transmission and, more specifically, relates to radio access technology carrier aggregation.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

| | |
|---|---|
| 3GPP | third generation partnership project |
| ACK | acknowledge |
| BTS | base transceiver system |
| BW | bandwidth |
| C-Plane | control plane |
| CC | component carrier |
| CN | core network |
| CQI | channel quality indicator |
| DC | dual carrier |
| DL | downlink (eNB, Node B towards UE) |
| DTX | discontinuous transmission |
| E-DCH | enhanced downlink channel |
| EDGE | enhanced data rates for GSM evolution |
| eNB | EUTRAN Node B (evolved Node B) |
| EPC | evolved packet core |
| EUTRAN | evolved UTRAN (LTE) |
| GGSN | gateway general packet radio system support node |
| GSM | global system for mobile communication |
| HARQ | hybrid automatic repeat request |
| HO | handover |
| H-RNTI | HS-DSCH radio network transaction identifier |
| HS-DSCH | high speed downlink shared channel |
| HS-SCCH | high speed shared control channel |
| HSPA | high speed packet access |
| HSDPA | high speed downlink packet access |
| HSUPA | high speed uplink packet access |
| I-HSPA | internet HSPA (evolved HSPA) |
| IP | internet protocol |
| L1 | layer 1 (physical (Phy) layer) |
| L2 | layer 2 (MAC layer) |
| LTE | long term evolution |
| MAC | medium access control |
| MM/MME | mobility management/mobility management entity |
| NACK | not acknowledge/negative acknowledge |
| NBAP | Node B application part (signaling) |
| Node B | base station (includes BTS) |
| OFDMA | orthogonal frequency division multiple access |
| O&M | operations and maintenance |
| PDCP | packet data convergence protocol |
| PDU | protocol data unit |
| Phy | physical |
| PMI | pre-coding matrix index |
| PRB | physical resource block |
| PDCCH | physical downlink control channel |
| PDSCH | physical downlink shared channel |
| PUCCH | physical uplink control channel |
| PUSCH | physical uplink shared channel |
| RACH | random access channel |
| RAT | radio access technology |
| RB | radio bearer |
| RE | resource element |
| RLC | radio link control |
| RNC | radio network controller |
| RNTI | radio network temporary identifier |
| ROHC | robust (internet) header compression |
| RRC | radio resource control |
| SAW | stop-and-wait |
| SC-FDMA | single carrier, frequency division multiple access |
| SGSN | serving gateway support node |
| SGW | serving gateway |
| SINR | signal to interference plus noise ratio |
| SR | scheduling request |
| TCP | transmission control protocol |
| TFRC | TCP-friendly rate control |
| TTI | transmit time interval |
| U-Plane | user plane |
| UE | user equipment |
| UL | uplink (UE towards eNB, Node B) |
| UTRAN | universal terrestrial radio access network |
| WCDMA | wideband code division multiple access |

The specification of a communication system known as evolved UTRAN (EUTRAN, also referred to as UTRAN-LTE or as EUTRA) has been specified by 3GPP in Rel-8 (release eight). As specified, the DL access technique is OFDMA, and the UL access technique is SC-FDMA.

One specification of interest is 3GPP TS 36.300, V8.10.0 (2009-9), 3rd Generation Partnership Project; Technical Specification Group Radio Access Network; Evolved Universal Terrestrial Radio Access (EUTRA) and Evolved Universal Terrestrial Access Network (EUTRAN); Overall description; Stage 2 (Release 8). This system may be referred to for convenience as LTE Rel-8 (which also contains 3G HSPA and its improvements). In general, the set of specifications given generally as 3GPP TS 36.xyz (e.g., 36.211, 36.311, 36.312, etc.) may be seen as describing the Release 8 LTE system. More recently, Release 9 versions of at least some of these specifications have been published including 3GPP TS 36.300, V9.1.0 (2009-9).

FIG. 1A reproduces FIG. 4.1 of 3GPP TS 36.300, and shows the overall architecture of the E-UTRAN system. The E-UTRAN system includes eNBs, providing the EUTRA user plane (PDCP/RLC/MAC/PHY) and control plane (RRC) protocol terminations towards the UE. The eNBs are interconnected with each other by means of an X2 interface. The eNBs are also connected by means of an S1 interface to an EPC, more specifically to a MME (Mobility Management Entity) by means of a S1 MME interface and to a Serving Gateway (SGW) by means of a S1 interface. The S1 interface supports a many to many relationship between MMEs/Serving Gateways and eNBs.

The eNB hosts the following functions:

functions for Radio Resource Management: Radio Bearer Control, Radio Admission Control, Connection Mobility Control, Dynamic allocation of resources to UEs in both uplink and downlink (scheduling);

IP header compression and encryption of the user data stream;

selection of a MME at UE attachment;

routing of User Plane data towards Serving Gateway;

scheduling and transmission of paging messages (originated from the MME);

scheduling and transmission of broadcast information (originated from the MME or O&M);

scheduling and transmission/reception of user data over the radio interface; and measurement and measurement reporting configurations to provide mobility and scheduling.

Of particular interest herein are the further releases of 3GPP LTE targeted towards future IMT-A systems, referred to herein for convenience simply as LTE-Advanced (LTE-A).

Reference can be made to 3GPP TR 36.814, V1.3.1 (2009-06), 3rd Generation Partnership Project; Technical Specification Group Radio Access Network; Further Advancements for E-UTRA Physical Layer Aspects (Release 9). Reference can also be made to 3GPP TR 36.913, V8.0.1 (2009-3), 3rd Generation Partnership Project; Technical Specification Group Radio Access Network; Requirements for Further Advancements for E-UTRA (LTE-Advanced) (Release 8). A goal of LTE-A is to provide significantly enhanced services by means of higher data rates and lower latency with reduced cost.

GSM, WCDMA, and LTE in their first releases utilized single carrier transmission. Since then, multicarrier operation has been introduced in GERAN EGDE and WCDMA HSDPA (TS25.308 Rel-8-Rel-9) and HSUPA in (TS25.319 Rel9) operation. In HSPA multicarrier operation, the UE and Node B transmit on two parallel carriers in quite an independent manner and the multicarrier operation can be seen as multiple parallel single carrier transmissions performed on different carrier frequencies to/from the single UE. The multicarrier operation in HSDPA (dual cell or dual band) supports only single carrier uplink operation, but the Dual carrier HSUPA requires dual carrier downlink operation.

As is specified in 3GPP TR 36.913, LTE-A should operate in spectrum allocations of different sizes, including wider spectrum allocations than those of Rel-8 LTE, e.g., up to 100 MHz, to achieve the peak data rate of 100 mega-bits per second (Mbit/s) for high mobility and 1 Gbit/s for low mobility. LTE-A (to be included into 3GPP Release-10) is going to include carrier aggregation (CA), providing the capability to aggregate together up to five LTE carriers referred to as Component Carriers (CCs). The basic principle of CA in LTE for a single RAT is presented on FIG. 1B, which shows an example of the carrier aggregation, where M Rel-8 component carriers are combined together to form MxRel-8 BW, e.g. 5×20 MHz=100 MHz given M=5.

Rel-8 terminals receive/transmit on one component carrier, whereas LTE-Advanced terminals may receive/transmit on multiple component carriers simultaneously (as shown in FIG. 1B) to achieve higher (e.g., wider) bandwidths. Basic scenarios for both downlink and uplink will be included into Release-10 (Rel-10). Similar work has also been carried out in the 3GPP in the context of HSDPA. In Release-10 the work on four-carrier HSDPA is currently ongoing, providing support for up to four, five mega-Hertz (MHz) carriers.

In LTE, the carrier aggregation, also called the multicarrier solution, is one of the main features to be defined for Rel-10 (TR36.814 and TR36.912) for LTE-A. In LTE also the basic principles are similar as the component carriers (single Rel-8 carrier) operate independently. Also in this specification, work will contain the operation with single carrier uplink with multiple downlink carriers.

While carrier aggregation is beneficial, especially because of the large amount of bandwidth it provides, integration is still a problem.

BRIEF DESCRIPTION OF THE DRAWINGS

The foregoing and other aspects of embodiments of this invention are made more evident in the following Detailed Description of Exemplary Embodiments, when read in conjunction with the attached Drawing Figures, wherein:

FIG. 2, including FIG. 2A shows a logical split of roles of LTE and HSPA radios in inter-RAT carrier aggregation, where a user equipment communicates with a network node using carrier aggregation on LTE and HSDPA component carriers; and FIG. 2B shows an example of carrier aggregation for RAT where both intra-band (carriers one and two) and inter-band (carrier three combined with carriers one and two) carrier aggregation;

FIG. 3, including

SUMMARY

Figure 1A:
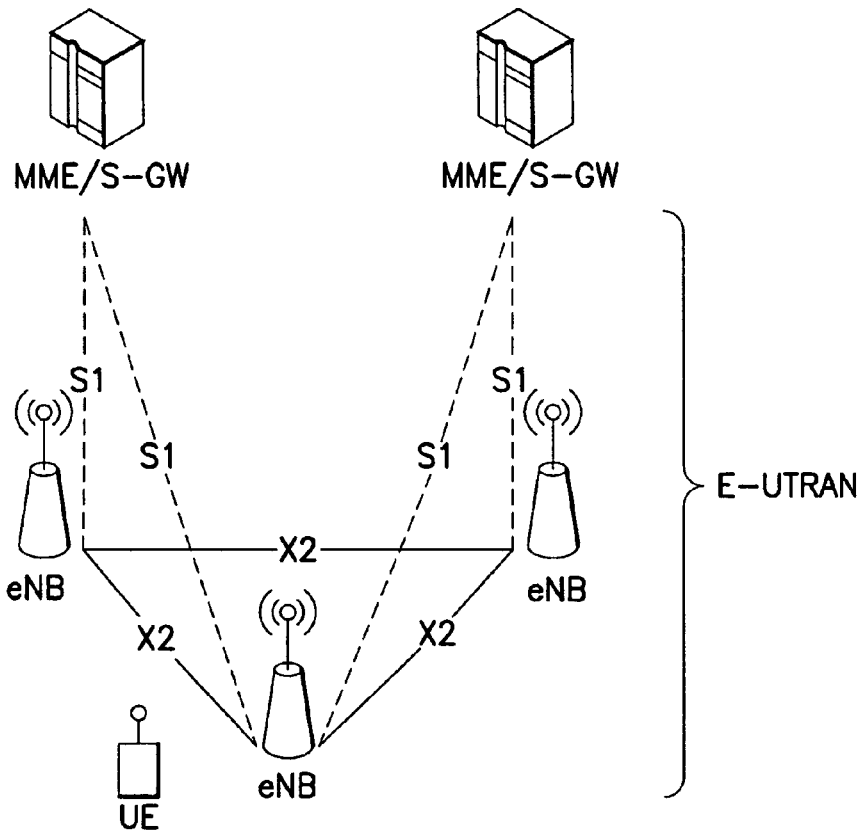
FIG. 1A reproduces FIG. 4.1 of 3GPP TS 36.300, and shows the overall architecture of the EUTRAN system.
Figure 1B:
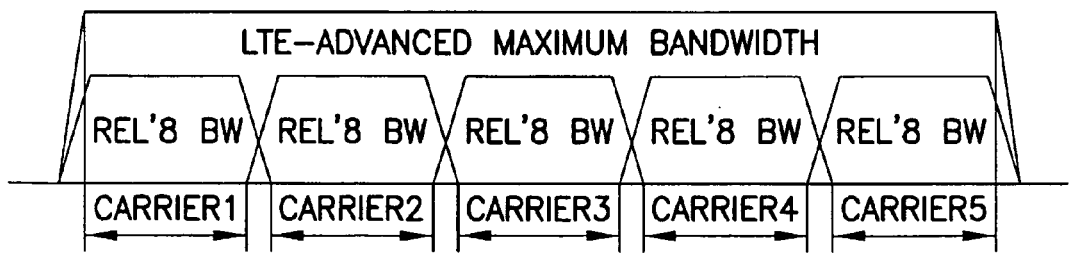
FIG. 1B shows an example of carrier aggregation for a single RAT as proposed for the LTE-A system.

In an exemplary embodiment, a method is disclosed that includes enabling interoperability between different types of wireless communication systems operating with different types of air interfaces to provide at least downlink radio resource aggregation for a user equipment. The enabling includes establishing a first connection between a medium access control protocol layer of a first wireless communication system and a physical layer of the first wireless communication system; establishing a second connection between the medium access control protocol layer of the first wireless communication system and a medium access control protocol layer of a second wireless communication system; using the first connection, performing wireless communications with the user equipment via one or more component carriers over a first air interface of the first wireless communication system; and communicating data over the second connection, the data used in wireless communications via one or more component carriers over a second air interface of the second wireless communication system.

In another exemplary embodiment, an apparatus includes one or more processors and one or more memories including computer program code. The one or more memories and the computer program code configured to, with the one or more processors, cause the apparatus to perform at least the following: enabling interoperability between different types of wireless communication systems operating with different types of air interfaces to provide at least downlink radio resource aggregation for a user equipment by: establishing a first connection between a medium access control protocol layer of a first wireless communication system and a physical layer of the first wireless communication system; establishing a second connection between the medium access control protocol layer of the first wireless communication system and a medium access control protocol layer of a second wireless communication system; using the first connection, performing wireless communications with the user equipment via one or more component carriers over a first air interface of the first wireless communication system; and communicating data over the second connection, the data used in wireless communications via one or more component carriers over a second air interface of the second wireless communication system.

In another exemplary embodiment, a method includes, over an interface between a first wireless communication system and a second wireless communication system, receiving a request for wireless communications with a user equipment, the wireless communications to take place via one or more component carriers over a first air interface of the first wireless communication system and via one or more component carriers over a second air interface of the second wireless communication system. The method also includes, using the interface, responding to the request with link configuration information to be used by the user equipment for the wireless communications to the user equipment using the one or more component carriers over the second air interface of the second wireless communication system.

In a further exemplary embodiment, an apparatus includes one or more processors and one or more memories including computer program code. The one or more memories and the computer program code configured to, with the one or more processors, cause the apparatus to perform at least the following: over an interface between a first wireless communication system and a second wireless communication system, receiving a request for wireless communications with a user equipment, the wireless communications to take place via one or more component carriers over a first air interface of the first wireless communication system and via one or more component carriers over a second air interface of the second wireless communication system; and using the interface, responding to the request with link configuration information to be used by the user equipment for the wireless communications to the user equipment using the one or more component carriers over the second air interface of the second wireless communication system.

DETAILED DESCRIPTION

As described above, LTE-Advanced (to be specified in 3GPP Release 10) is going to include carrier aggregation (CA), providing the capability to aggregate together multiple LTE carriers, which are also known as component carriers (CCs). The basic principle of CA in LTE is presented on FIG. 2B, which shows an example of carrier aggregation for RAT, where both intra-band (carriers one and two) and inter-band (carrier three combined with carriers one and two) carrier aggregation are shown. Basic scenarios for both downlink and uplink are considered in Release 10 and further work, such as uplink inter-band carrier aggregation are to be included into 3GPP Release 11 (R2-1018460). R2-1018460 is 36.300 CR (change request) 0190, rev. 1, current version 9.2.0. However the availability of the frequency spectrum on multiple bands is a challenge, as operators have often their bands occupied by, e.g., HSPA deployments and may be able to get new LTE spectrum only for example for 2.6 GHz.

Figure 2A:
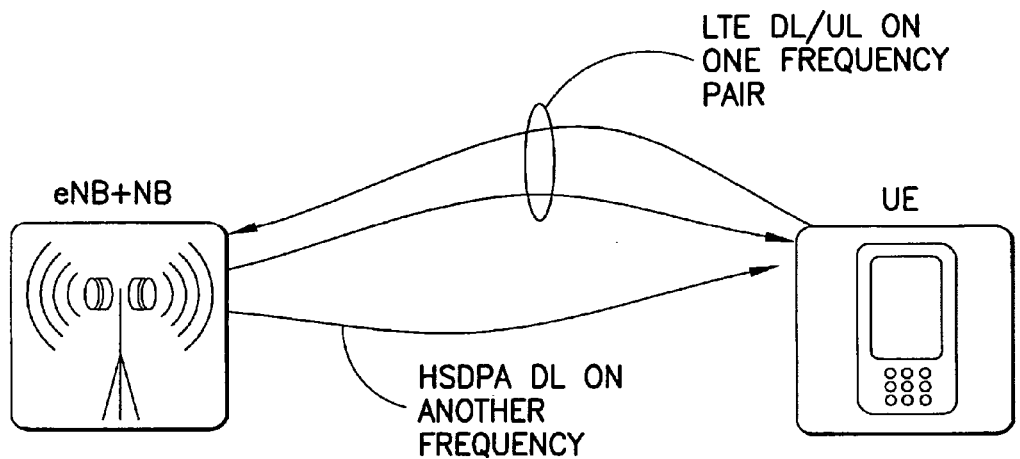
FIG. 2A and FIG. 2B, is a simplistic diagram of inter-RAT carrier aggregation, where.
Figure 2B:
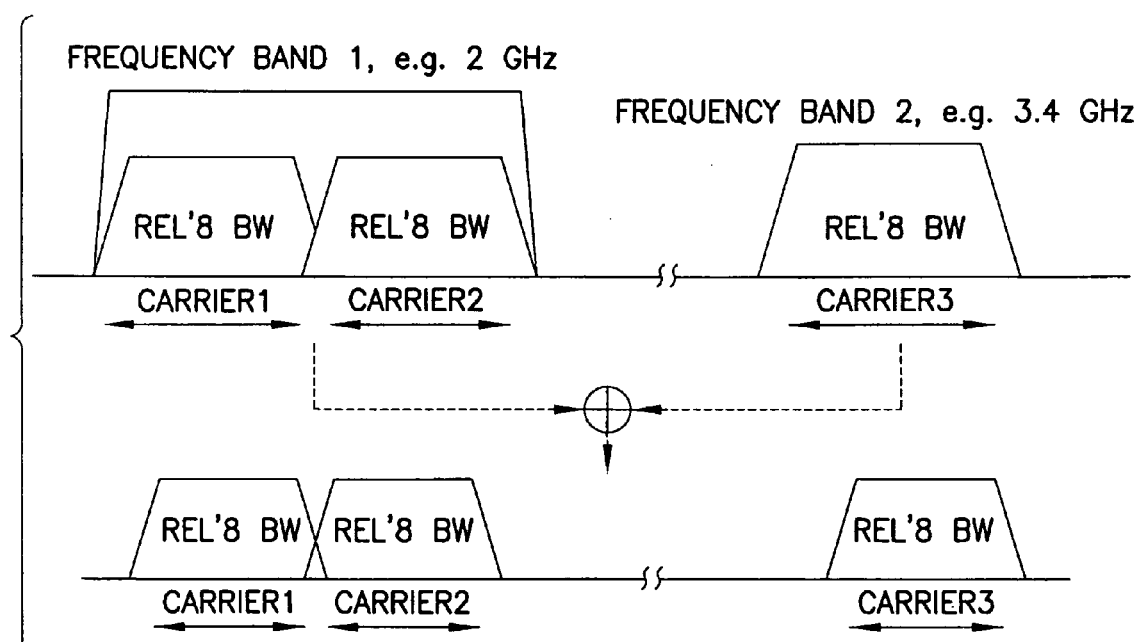

In this context, considerations of whether one of the component carriers could be an LIE (or LTE-Advanced in general) carrier while the other carrier could be a HSPA carrier have been raised. FIG. 2A is an example a logical split of roles of LTE and HSPA radios in inter-RAT carrier aggregation, where a user equipment communicates with a network node using carrier aggregation on LTE and HSPA component carriers. In this case, the network node has both eNB (eNode B) and NB (Node B) functionality and air interfaces.

In LTE-Advanced, the CA solutions being examined mainly look to aggregate only LTE carriers. However, it is natural to consider also use of other technologies here. From the data rate perspective, HSDPA becomes a RAT to consider, as it gives similar peak data rates on comparable bandwidths as LTE (Release 10 work in four-carrier HSDPA on-going, having up to four carriers, each being five MHz), and the technology is already deployed in the sites of multiple different operators. Furthermore, the similarities in the physical layer of the two systems make it possible to largely reuse the same hardware.

From an implementation as well as a system design point of view, an attractive solution would be to limit the usage of HSPA in inter-RAT aggregation to the downlink only, and to transmit the necessary HSPA related control signaling over the LTE radio interface. FIG. 2A shows an example of this, where the user equipment (UE) receives simultaneously on LTE DL (using OFDMA) and HSDPA DL (using WCDMA), but only uses the LTE UL (using SC-FDMA).

Utilizing both HSDPA and LIE radio interfaces independently (that is, the case where the two radios are not interconnected, and have their own core network interface and have both DL and UL operating) for simultaneous reception of the same data stream (or different services) raises a number of challenges including:
  1. How to efficiently ensure service continuity;
  2. How to provide reliable reception of packets that were missed in the transmission process when one of the technologies was momentarily dropped.

Also, the core network (CN) would have difficulties in dealing with the two different radios, as there are dedicated interfaces to LTE and HSPA radio access networks from the core network (Iu interface to WCDMA/HSPA RAN and S1 to LTE RAN).

Moreover, in the case of inter-RAT carrier aggregation, it is beneficial to have only one control plane activity in the terminal and it is now assumed that only the LIE control plane would be the active one. Having only the LTE control plane be the only active control plane includes the following problems:
  With the two different radios transmitting to one UE, information needs to be obtained from HSPA (HSDPA) side to the LTE eNodeB, so that both the UE is able to receive HSDPA data and the HSPA Node B knows the identity of the UE to be used when transmitting data to it, and the data flow QoS characteristics needed in scheduling prioritization (normally received from the RNC).
  Otherwise, the UE would need to have RRC connection to the HSPA side as well, which would require running the control planes simultaneously in the UE; this would also require the RNC functionality to be (more) aware of the device (the new UE that is aggregated with HSDPA downlink without the RNC actually even needing to know that the UE is there) that is otherwise fully controlled by the LTE eNodeB.

In one aspect, exemplary embodiments of the invention herein define an LTE and HSPA resource aggregation approach, where data streams are divided in an LTE eNB to feed to both LTE CCs and HSDPA CCs. This allows for having aggregation of HSDPA and LTE without visibility to the core network. With this approach, the LTE, eNB is responsible for dividing data streams onto CCs utilizing different L1. In another aspect, exemplary embodiments of the invention define information exchange procedures and principles on how to activate connections between multiple RATs (e.g., LIE and HSPA) for inter-RAT communication and how the resources are shared on the HSDPA downlink when part of the UEs are receiving data using both in HSDPA and LTE air interfaces.

Figure 3A:
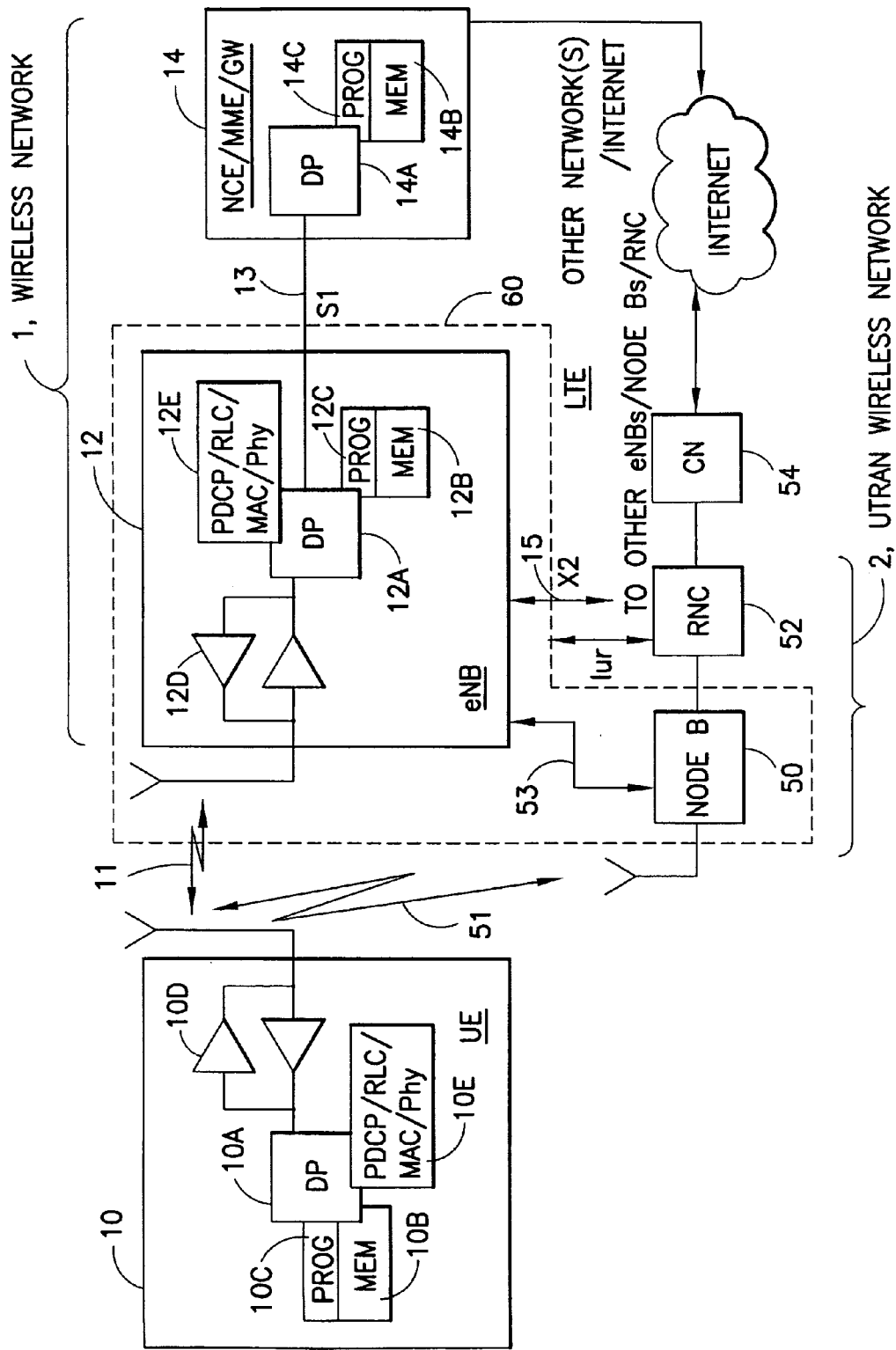
FIGS. 3A and 3B, shows a simplified block diagram of various electronic devices that are suitable for use in practicing the exemplary embodiments of this invention.
Figure 3B:
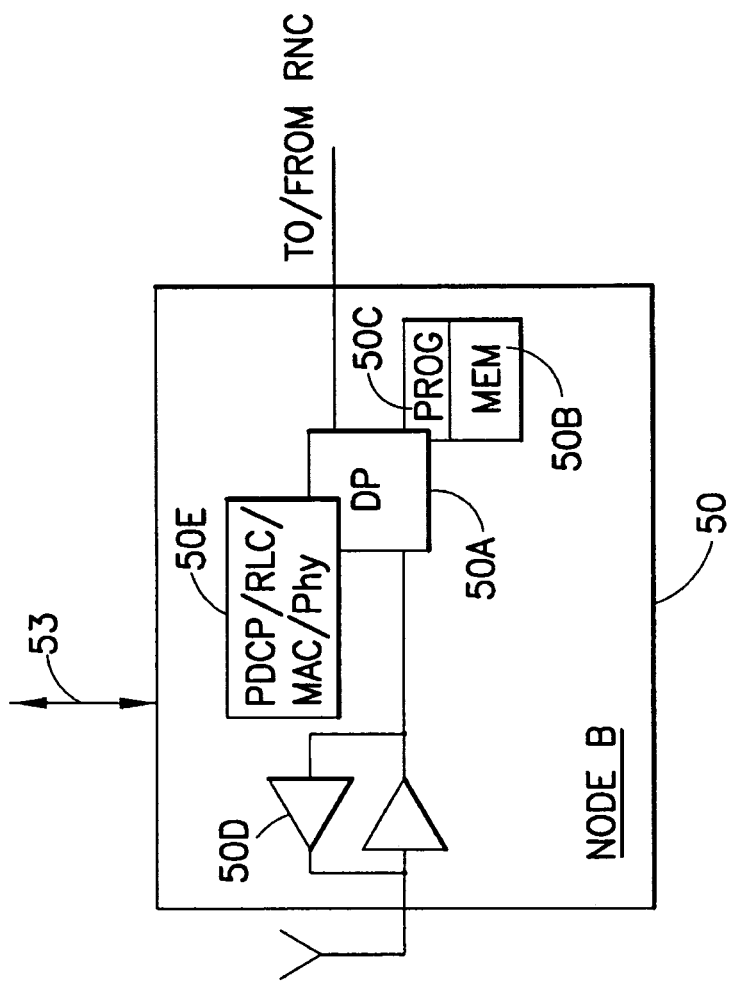

Before describing in further detail the exemplary embodiments of this invention, reference is made to FIG. 3, including FIGS. 3A and 3B, for illustrating a simplified block diagram of various electronic devices and apparatus that are suitable for use in practicing the exemplary embodiments of this invention. In FIG. 3, a wireless network 1 is adapted for communication over a wireless link 11 with an apparatus, such as a mobile communication device which may be referred to as a UE 10, via a network access node, such as an eNB 12 for the case of an LTE or LIE-A network. The network 1 may include a network control element (NCE) 14 that may include the MME/SGW functionality shown in FIG. 1A, and which provides connectivity with a further network, such as a telephone network and/or a data communications network (e.g., the internet). The UE 10 includes a controller, such as a computer or a data processor (DP) 10A, a computer-readable memory medium embodied as a memory (MEM) 10B that stores a program of computer instructions (PROG) 10C, and at least one suitable radio frequency (RF) transceiver 10D for bidirectional wireless communications with the eNB 12 via one or more antennas. The eNB 12 also includes a controller, such as a computer or a data processor (DP) 12A, a computer-readable memory medium embodied as a memory (MEM) 12B that stores a program of computer instructions (PROG) 12C, and at least one suitable RF transceiver 12D for communication with the UE 10 via one or more antennas. The eNB 12 is coupled via a data/control path 13 to the NCE 14. The path 13 may be implemented as the S1 interface shown in FIG. 1A. The eNB 12 may also be coupled to another eNB (or Node B) via data/control path 15, which may be implemented as the X2 interface shown in FIG. 1A.

For the purposes of describing the exemplary embodiments of this invention, the UE 10 may be assumed to also include a protocol stack (e.g., at least PDCP/RLC/MAC/Phy) 10E, and the eNB 12 includes a protocol stack (e.g., at least PDCP/RLC/MAC/Phy) 12E.

Also shown in FIG. 3 is a second, UTRAN wireless network 2, which is adapted for communication over a wireless link 51 with the UE 10. The wireless network 2 is, e.g., a HSPA wireless network including at least one Node B 50, at least one RNC 52 (together forming the UTRAN) and a CN 54 providing connectivity with a further network, such as a telephone network and/or a data communications network (e.g., the internet). It is assumed that the Node B 50, the RNC 52 and the elements of the CN 54 (e.g., the SGSN and GGSN) will be similarly constructed to also include data processors, memories storing computer programs and other data, and the necessary wireless transceivers and the like for communication with the UE 10.

For instance, in FIG. 3B, it is shown that the Node B 50 also includes a controller, such as a computer or a data processor (DP) 50A, a computer-readable memory medium embodied as a memory (MEM) 50B that stores a program of computer instructions (PROG) 50C, and at least one suitable RF transceiver 50D for communication with the UE 10 via one or more antennas. The Node B 50 may be assumed to also include a protocol stack (e.g., at least PDCP/RLC/MAC/Phy) 50E.

In the example of FIG. 3, a new data/control path 53 is defined between the Node B 50 and the eNB 12. This data/control path 53 is described in more detail below.

The Node B 50 and eNB 12 can be co-located in a single location (e.g., that serves one or more cells), as illustrated by reference numeral 60. The Node B 50 and eNB 12 may also be combined into a single network node (as illustrated by other figures). The Node B 50 and eNB 12 may also be physically separate. In an alternative structure, the RNC 52 could also be part of a device illustrated by reference numeral 60.

It is assumed for the purposes of this invention that the UE 10 is a multi-mode (dual mode or higher) device capable of operation in different types of wireless networks. For example, there can be a plurality of transceivers 10D, where one or more operate in accordance with LTE OFDMA (and LTE SC-FDMA), and where one or more other transceivers operate in accordance with HSPA WCDMA. The program stored in memory 10B is thus assumed to be capable of operation with two or more different types of wireless networks as well, and for establishing and operating the protocol stack 10E in accordance with the particular type of wireless network standard that is in effect at any given time. The techniques herein may be considered as being implemented solely as computer program code in the UE 10, eNode B 12, and Node B 50 (e.g., as PROG 10C, 12C, or 50C, respectively), or as a combination of computer program code (executed by one or more processors) and various hardware, including memory locations, data processors, buffers, interfaces and the like, or entirely in hardware.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 10B, 12B, and 50B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A, 12A, and 50A may be of any type suitable to the local technical environment, and may include one or more of general purpose computers, special purpose computers, microprocessors, digital signal processors (DSPs) and processors based on a multi-core processor architecture, as non-limiting examples.

Figure 4:
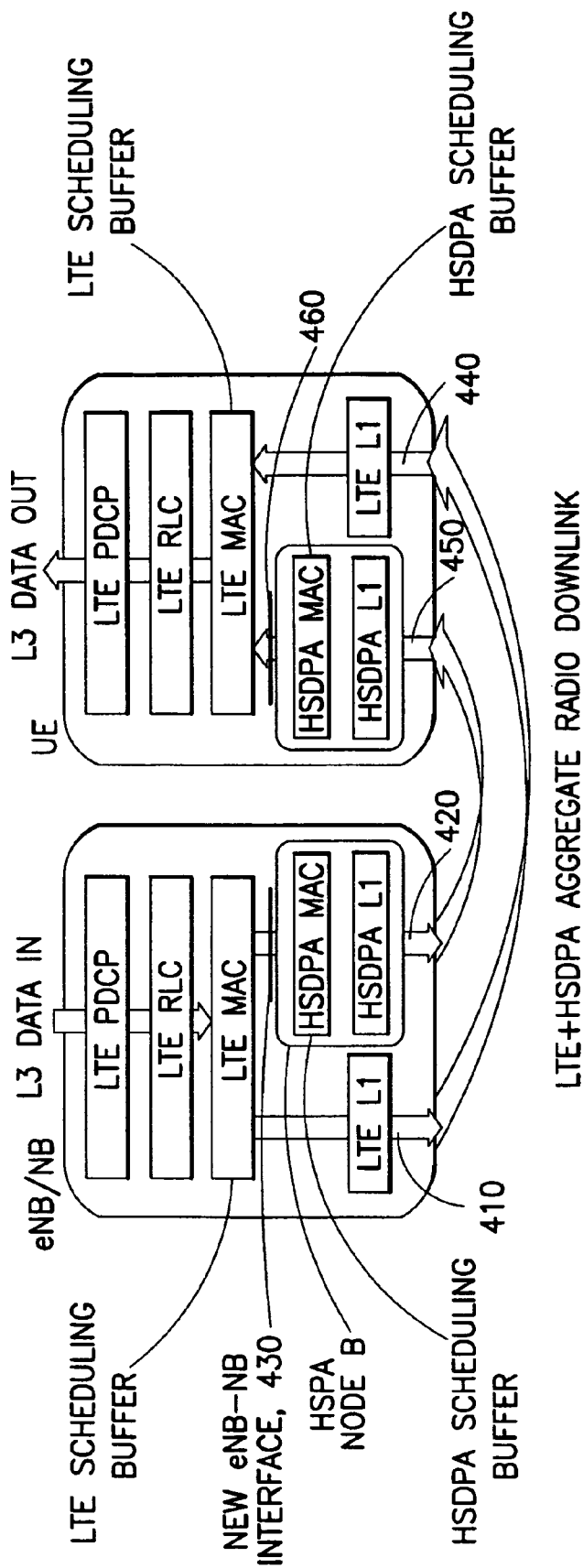
FIG. 4 is an illustration of a user plane protocol layer split in an exemplary embodiment.

Referring now to FIG. 4, this figure shows an exemplary illustration of a user plane protocol layer split. To align with the LTE-Advanced principles (e.g., R2-101846), carrier aggregation is at least partially implemented in the LTE MAC layer, since with LTE-Advanced the LTE MAC layer is responsible for CC selection and could also feed the HSDPA MAC layer as well. This allows the HSDPA MAC layer to make the actual scheduling decision for data communicated to it via the connection 420. In the case of FIG. 4, flow control could be used to provide information of the HSDPA MAC buffer status (i.e., the status of the HSDPA scheduling buffer) of the particular user to the LTE MAC protocol layer. The flow control provided by, e.g., the LTE MAC protocol layer maintains the LTE scheduling buffer for data transmission in the LIE radio, indicates to the LTE RLC layer when the LTE MAC layer can take more data for transmission, and decides whether to forward data to HSDPA MAC or send the data over LTE radio. This acts as a flow control mechanism between LTE MAC and LTE RLC. The HSDPA MAC layer may also have its own scheduling buffer, and the LTE MAC, being in charge of splitting the data coming from LTE RLC layer, needs to know how much data is pending for transmission in HSDPA MAC scheduling buffer too. Using the same flow control towards LTE MAC as currently towards HSDPA RLC (typically in RNC) allows minimization of the changes in the HSDPA MAC side.

In the possible data path organization of FIGS. 3 and 4, the LTE eNode B receives L3 data from the core network (e.g., NCE/MME/GW 14 in FIG. 3), processes the data through the LTE MAC layer, where the data is split (e.g., separated) between a first connection 410 for the LTE radio to be transmitted by the eNB, and between a second connection 420 for the HSPA radio to be forwarded to the HSPA Node B for transmission. As stated above, the HSPA Node B can be either a separate device, or embedded in the LTE eNode B.

The connection 420 uses the data/control path 53 (see FIG. 3). The data/control path 53 may be internal to the LTE eNode B (e.g., if the HSPA Node B and the LTE eNode B are embedded together in a single device) or may be external to the LTE eNode B (e.g., if the HSPA Node B is not part of the same device as the LTE eNode B). Signaling over new eNB-NB interface 430 is described in more detail below.

Aggregate and simultaneous LIE and HSDPA transmissions are performed from the eNB/NB to the UE over the LTE and HSDPA aggregate radio downlink. As described above in reference to FIG. 2B, for LIE and HSDPA carrier aggregation, the LIE and HSDPA radios operate on different frequencies. The UE LTE MAC layer rejoins the two data flows on connections 440, 450 after LIE and HSDPA reception.

The principles described in reference to FIG. 4 could be extended for the uplink as well, although described here mainly for the downlink direction. For instance, in the uplink direction, one LTE RLC would also feed both LIE and HSUPA carriers and in the BTS side after MAC layers on both LTE and HSUPA side, the data would be fed to the LTE RLC layer. Thus, the connections 440 and 450 are directed to the LTE MAC layer and there is also a new interface 460 between the LTE MAC layer and the HSDPA MAC layer.

Figure 5:
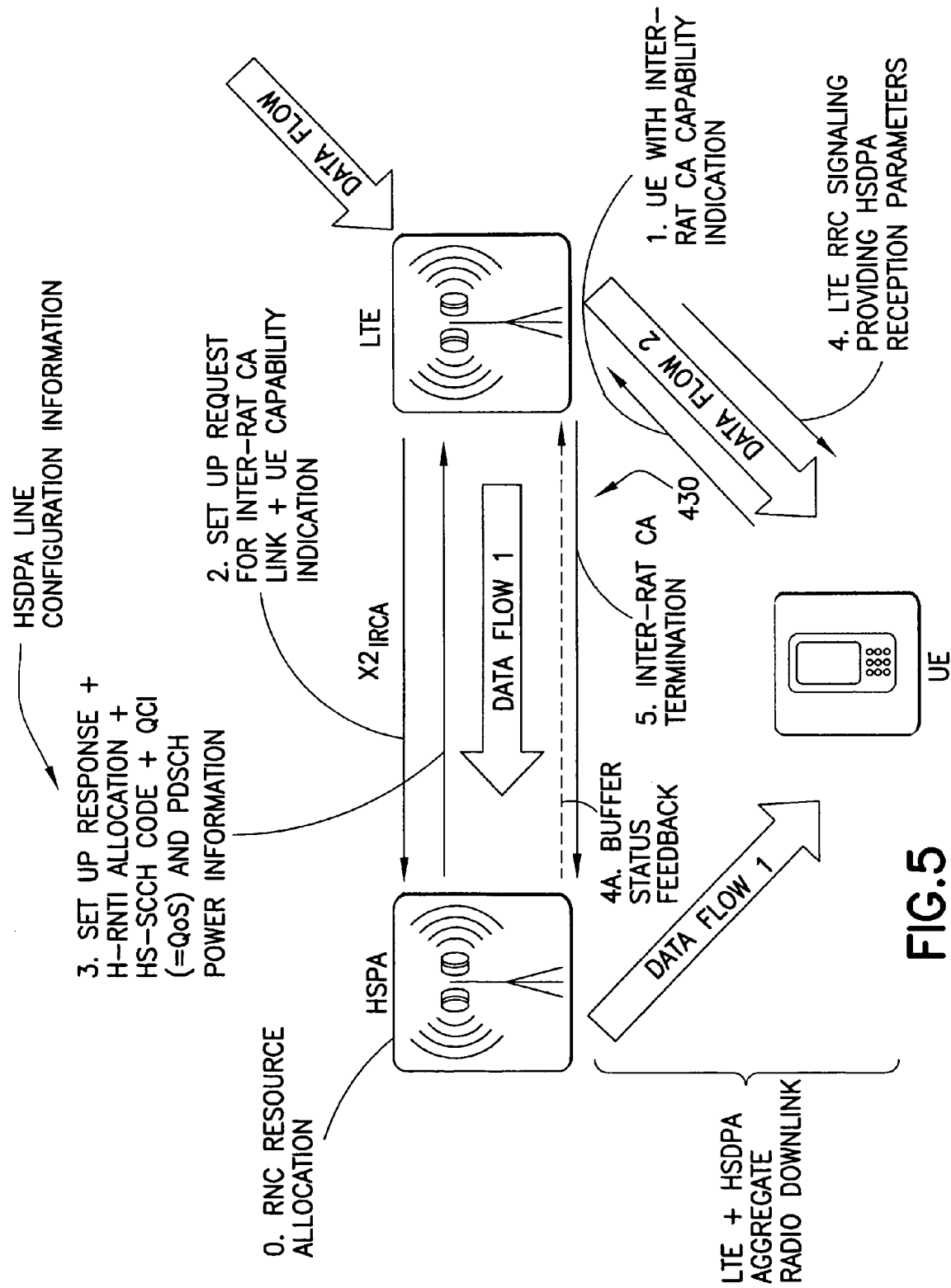
FIG. 5 is an example of signaling between LTE and HSPA base stations over a new (e.g., X2-type) interface.

Turning now to FIG. 5, this figure shows an example of signaling between LTE and HSPA base stations over a new (e.g., X2-type) interface (interface 430). The $X2_{IRCA}$ stands for X2 Inter-RAT Carrier Aggregation. FIG. 5 shows the following exemplary information exchange between the HSDPA and LIE controlling entities:

0. The RNC configures the HSPA Node B with the resources the HSPA Node B may allocate for LTE-HSDPA aggregation use. For example, the operator may, e.g., have a license for 10 simultaneous LIE users that can be aggregated with HSDPA, or require some percent of TTIs must be used to serve HSDPA only users if they have data in the buffer, or require that the aggregate maximum bit rate of the LIE users can receive from the HSDPA cell is some value (e.g., in Mbps).

1. The LTE eNodeB has received indication from the UE, which indicates whether the UE is capable of LTE/HSPA carrier aggregation. This may also involve HSPA related measurement information.

2. The LTE eNodeB provides a set-up request to the HSDPA controlling entity, together with the UE capability indication (e.g., HSDPA related capabilities). The "UE capability indication" indicates the capability of the HSDPA receiver, which tells, e.g., if the UE supports 64 QAM (quadrature amplitude modulation) or MIMO (multiple input, multiple output) or on what frequency bands and in how many carriers simultaneously the user equipment can receive HSDPA data.

3. The HSDPA controlling entity (e.g., the HSDPA Node B, but this function could also be assigned to a software/hardware element inside the HSDPA Node B) responds with the necessary HSDPA link configuration information (derived from the resource the RNC has allocated for the HSDPA Node B to be used use in a particular cell), including HSDPA code space information (PDSCH codes) as well as the H-RNTI allocation. H-RNTI is an abbreviation for HS-DSCH radio network transaction identifier. The response may also include the HS-SCCH code(s), the QCI (quality of service, QOS, class indicator), and PDSCH power information. At least part or all of this information include the parameters of the communication to be performed with the UE. That is, the UE (after receiving this information in 4 below) performs at least the reception of the data flow$_1$ based on the parameters in the information.

4. This information (the information in 3 above) is then forwarded to the UE (assuming a positive response is received). A negative response would be that the HSPA base station rejects the request to aggregate HSDPA carrier to this user served by the LTE base station. This forwarding can be as part of LTE RRC signaling or as a transparent container within the LTE RRC.

5. Then the data flow is provided to both LTE and HSPA base stations. Data flow$_1$ is the data flow through connection 420 and transmitted by the HSPA base station to the UE. Data flow$_2$ is the data flow through the LTE base station to the UE. As shown in FIG. 4, both the data flow$_1$ and the data flow$_2$ were split from the data flow in the L3 data in. As also shown in FIG. 4, the UE then recombines the data into a single flow, the L3 data out. Termination in FIG. 5 is used by the LTE base station to inform the HSDPA base station that the carrier aggregation is no longer needed and the user context can be released, e.g., because the call ended and the UE moved to idle mode. In this example, the PDSCH (using WCDMA) is used for the data flow$_1$ between the HSPA base station and the user equipment, and the data flow$_2$ uses OFDMA.

Another possible signaling is shown in 4A, where buffer status corresponding to the UE is provided from the HSPA base station to the LTE base station over the interface 430. As described above, this feedback helps in flow control.

Figure 6:
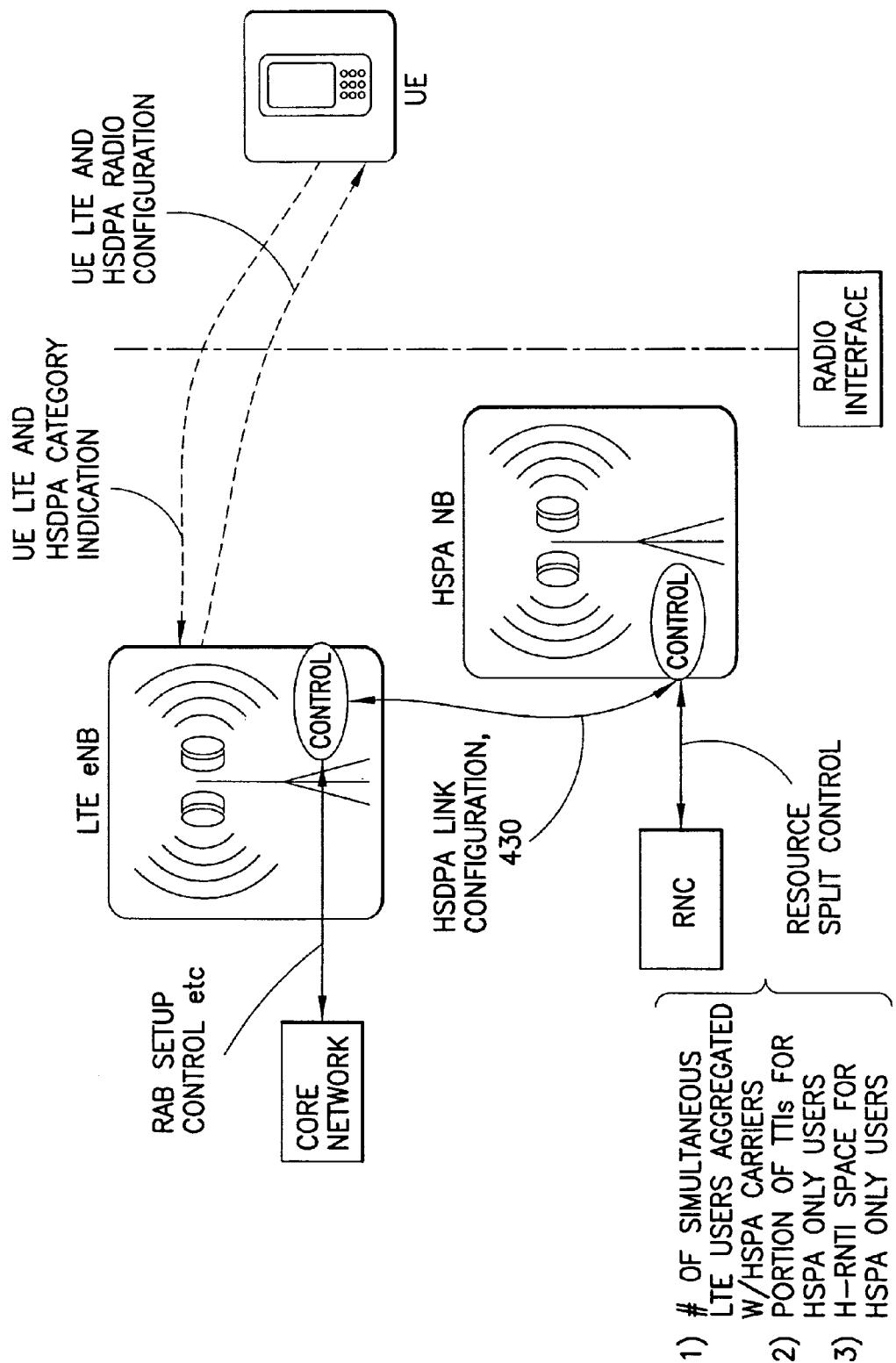
FIG. 6 illustrates an exemplary control signaling architecture when two radios reside in two (logically) separate base stations.

Referring to FIG. 6, this figure illustrates an exemplary control signaling architecture when two radios reside in two separate base stations. The two base stations are logically separate but may or may not be physically separate. The RNC would allocate resources in the HSPA Node B, for example indicating 1) how many simultaneous LTE users may be aggregated with a HSPA carrier(s), and/or 2) what portion of TTIs need to be available for HSPA only users, and/or 3) what H-RNTI space is reserved for these users, etc. This allocation would be performed by, e.g., extending the common Node B application part (NBAP) signaling to include the new signaling.

As previously described, the LTE eNode B and HSPA Node B would logically interact with a new eNB-NB interface (e.g., interface 430 over data/control path 53) similar to the LTE X2 interface. The call setup related messaging over the interface could be based on S1AP (S1 application protocol), NBAP (Node B application protocol) or radio network subsystem application part (RNSAP) messages. In some implementations, the interface could be inside a single multi-radio capable base station, between two physically separate co-sited base stations, or also between base stations that reside in different sites.

An exemplary implementation is two radios that are served by a single multi-radio base station. In this case, the interface (e.g. 420) between the two radios would be internal to the base station. Also in this case, aspects to consider include the RNC resource allocation in the HSPA cell for LTE-HSPA aggregation use, such as, e.g., the H-RNTI address space (H-RNTI identifies the user to which the HSDPA transmission is intended).

There may also be a desire to allow for multi-vendor implementation, where the HSPA base station is provided by one network (NW) vendor and the LTE base station by another. In this case, the interface between the two base stations would likely be point-to-point between two co-sited base stations.

Figure 7:
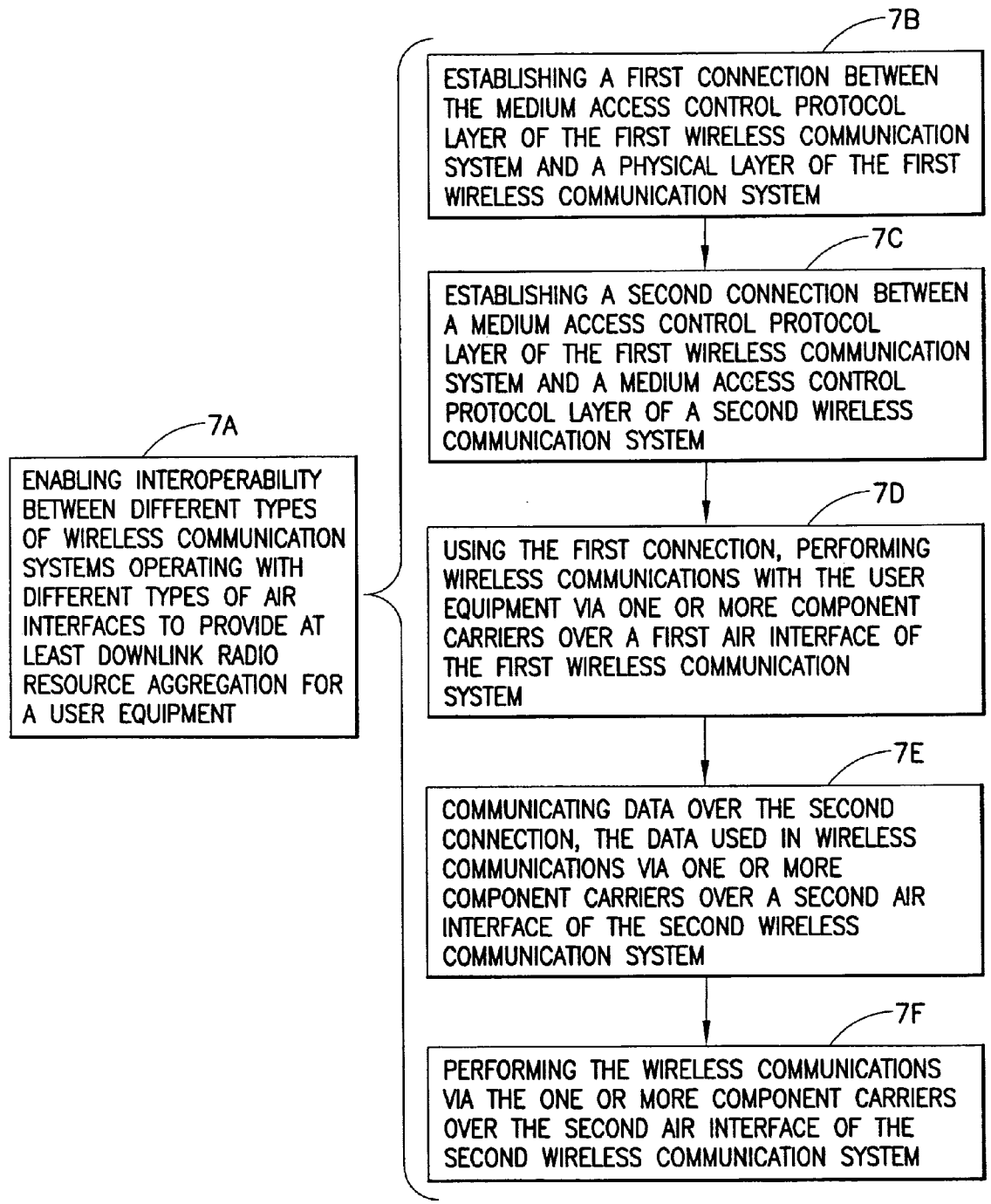
FIGS. 7 and 8 are logic flow diagrams that illustrate the operation of a method, and a result of execution of computer program instructions, in accordance with the exemplary embodiments of this invention.

FIG. 7 is a logic flow diagram that illustrates the operation of a method, and a result of execution of computer program instructions, in accordance with the exemplary embodiments of this invention. In accordance with these exemplary embodiments a method performs, at block 7A, enabling interoperability between different types of wireless communication systems operating with different types of air interfaces to provide at least downlink radio resource aggregation for a user equipment. This may be performed, e.g., at least by (block 7B) establishing a first connection between a medium access control protocol layer of a first wireless communication system and a physical layer of the first wireless communication system;

In block 7C, a second connection is established between the medium access control protocol layer of the first wireless communication system and a medium access control protocol layer of a second wireless communication system. In block 7D, using the first connection, wireless communications are performed with the user equipment via one or more component carriers over a first air interface of the first wireless communication system. In block 7E, data is communicated over the second connection, where the data is used in wireless communications via one or more component carriers over a second air interface of the second wireless communication system. Block 7A may also include block 7F, where the wireless communications are performed via the one or more component carriers over the second air interface of the second wireless communication system.

Figure 8:
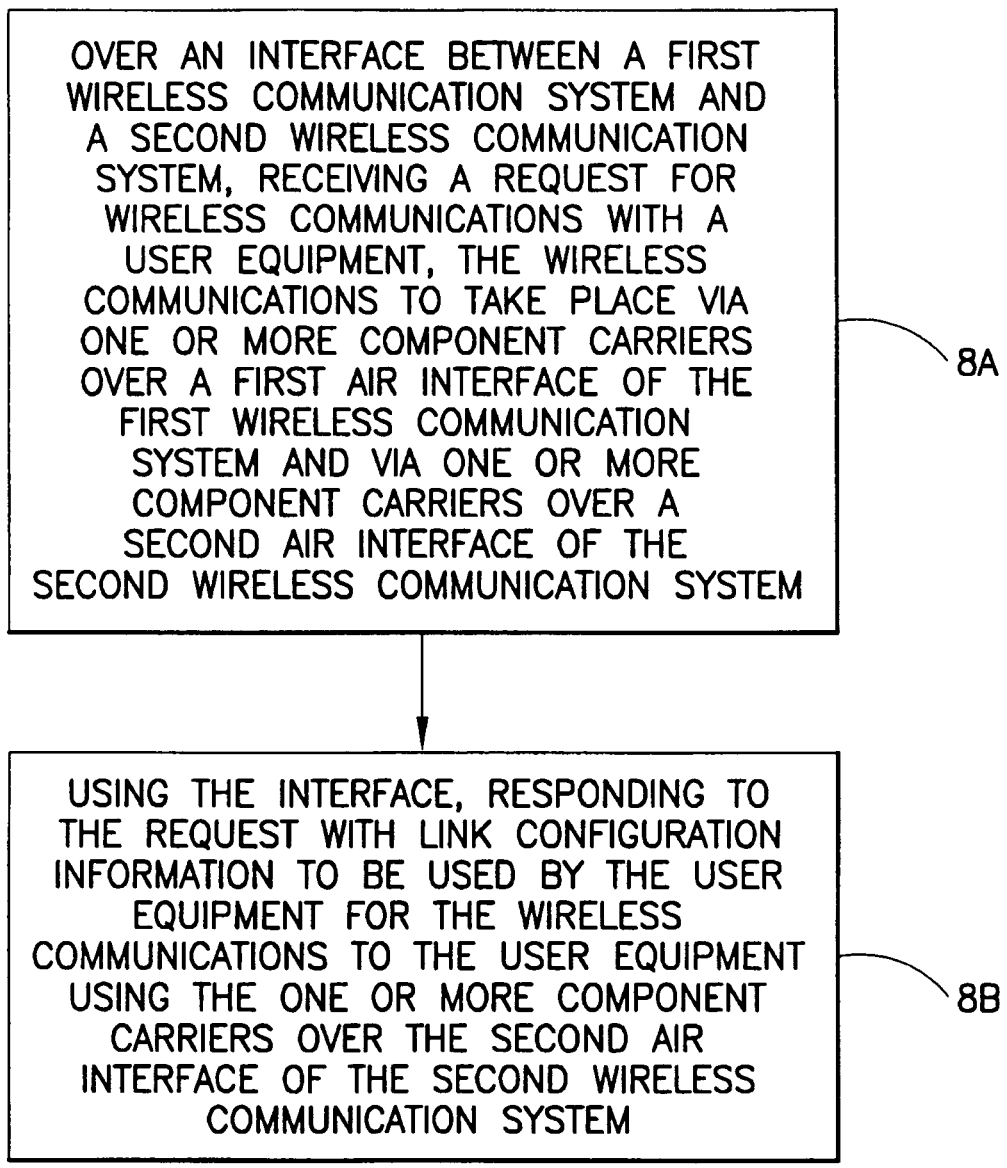

FIG. 8 is a logic flow diagram that illustrates the operation of a method, and a result of execution of computer program instructions, in accordance with the exemplary embodiments of this invention. In accordance with these exemplary embodiments a method performs, at block 8A, over an interface between a first wireless communication system and a second wireless communication system, a request is received for wireless communications with a user equipment. The wireless communications are to take place via one or more component carriers over a first air interface of the first wireless communication system and via one or more component carriers over a second air interface of the second wireless communication system. In block 8B, using the interface, the request is responded to with link configuration information to be used by the user equipment for the wireless communications to the user equipment using the one or more component carriers over the second air interface of the second wireless communication system.

The invention, depending on implementation, has at least the following advantages:

1. The invention allows for an operator to provide higher (e.g., peak) data rates compared to dedicated LTE and HSPA use;

2. The invention does not impact core network;

3. RNC would only need to understand part of the resources used for LIE traffic, but even without changes in the RNC, there would not be problems, as the RNC would only see smaller HSDPA capacity available;

4. The invention allows efficient migration of users from HSDPA to LTE;

5. Mobility management can be based only on a single system (where co-locating is assumed for the use of this), and if LTE getting too weak, it is possible to make an inter-system handover to the HSPA side (e.g., as normal LTE to HSPA handover); and 6. Use of MAC layer for the dividing of the data allows the scheduler to take into account the resource availability on both LIE and HSPA sides.

Without in any way limiting the scope, interpretation, or application of the claims appearing below, a technical effect of one or more of the example embodiments disclosed herein is to enable carrier aggregation for multiple RATs, such as LTE and HSPA. Another exemplary technical effect is to provide information exchange and an interface between the LIE MAC protocol layer and the HSDPA MAC protocol layer to enable carrier aggregation.

Embodiments of the present invention may be implemented in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with examples of computers described and depicted, e.g., in FIG. 3. A computer-readable medium may comprise a computer-readable storage medium that may be any media or means that can contain or store the instructions for use by or in connection with an instruction execution system, apparatus, or device, such as a computer.

It is also noted that any of the embodiments herein (including in the claims) may be implemented in an apparatus/device that includes means for performing certain functions. For example, an apparatus could include means for enabling interoperability between different types of wireless communication systems operating with different types of air interfaces to provide at least downlink radio resource aggregation for a user equipment. The means for enabling interoperability includes means for establishing a first connection between a medium access control protocol layer of a first wireless communication system and a physical layer of the first wireless communication system; means for establishing a second connection between the medium access control protocol layer of the first wireless communication system and a medium access control protocol layer of a second wireless communication system; and means, using at least the first and second connections, for performing wireless communications with the user equipment via one or more component carriers over a first air interface of the first wireless communication system and via one or more component carriers over a second air interface of the second wireless communication system.

As another example, an apparatus could include means, using an interface between a first wireless communication system and a second wireless communication system, for receiving a request for wireless communications with a user equipment. The wireless communications are to take place via one or more component carriers over a first air interface of the first wireless communication system and via one or more component carriers over a second air interface of the second wireless communication system. The apparatus also includes means, using the interface, for responding to the request with link configuration information to be used by the user equipment for the wireless communications to the user equipment using the one or more component carriers over the second air interface of the second wireless communication system.

In another exemplary embodiment, a computer program is disclosed that includes code for enabling interoperability between different types of wireless communication systems operating with different types of air interfaces to provide at least downlink radio resource aggregation for a user equipment by: establishing a first connection between a medium access control protocol layer of a first wireless communication system and a physical layer of the first wireless communication system; establishing a second connection between the medium access control protocol layer of the first wireless communication system and a medium access control protocol layer of a second wireless communication system; and, using at least the first and second connections, performing wireless communications with the user equipment via one or more component carriers over a first air interface of the first wireless communication system and via one or more component carriers over a second air interface of the second wireless communication system, when the computer program is run on a processor.

The computer program of the preceding paragraph wherein the computer program is a computer program product comprising a computer-readable medium bearing computer program code embodied therein for use with a computer.

In an additional exemplary embodiment, a computer program product is disclosed that comprises a computer-readable medium bearing computer program code embodied therein for use with a computer. The computer program code comprises: code for enabling interoperability between different types of wireless communication systems operating with different types of air interfaces to provide at least downlink radio resource aggregation for a user equipment by: establishing a first connection between a medium access control protocol layer of a first wireless communication system and a physical layer of the first wireless communication system; establishing a second connection between the medium access control protocol layer of the first wireless communication system and a medium access control protocol layer of a second wireless communication system; and using at least the first and second connections, performing wireless communications with the user equipment via one or more component carriers over a first air interface of the first wireless communication system and via one or more component carriers over a second air interface of the second wireless communication system.

In another exemplary embodiment, a computer program is disclosed that includes code for, over an interface between a first wireless communication system and a second wireless communication system, receiving a request for wireless communications with a user equipment, the wireless communications to take place via one or more component carriers over a first air interface of the first wireless communication system and via one or more component carriers over a second air interface of the second wireless communication system; and code for using the interface, responding to the request with link configuration information to be used by the user equipment for the wireless communications to the user equipment using the one or more component carriers over the second air interface of the second wireless communication system, when the computer program is run on a processor.

The computer program of the preceding paragraph wherein the computer program is a computer program product comprising a computer-readable medium bearing computer program code embodied therein for use with a computer.

In a further exemplary embodiment, a computer program product is disclosed that comprises a computer-readable medium bearing computer program code embodied therein for use with a computer. The computer program code comprises: code for over an interface between a first wireless communication system and a second wireless communication system, receiving a request for wireless communications with a user equipment, the wireless communications to take place via one or more component carriers over a first air interface of the first wireless communication system and via one or more component carriers over a second air interface of the second wireless communication system; and code for using the interface, responding to the request with link configuration information to be used by the user equipment for the wireless communications to the user equipment using the one or more component carriers over the second air interface of the second wireless communication system.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims

What is claimed is:

1. A method, comprising:
enabling interoperability between different types of wireless communication systems operating with different types of air interfaces to provide at least downlink radio resource aggregation for a user equipment by:
establishing a first connection between a medium access control protocol layer of a first wireless communication system and a physical layer of the first wireless communication system;
establishing a second connection between the medium access control protocol layer of the first wireless communication system and a medium access control protocol layer of a second wireless communication system;
using the first connection, performing wireless communications with the user equipment via one or more component carriers over a first air interface of the first wireless communication system;
communicating data over the second connection, the data used in wireless communications via one or more component carriers over a second air interface of the second wireless communication system; and
receiving at the first wireless communication system control information from the second wireless communication system,
wherein the control information includes information of available resources for data transmission over the second air interface of the second wireless communication system.

2. The method of claim 1, further comprising performing the wireless communications via the one or more component carriers over the second air interface of the second wireless communication system.

3. The method of claim 1, further comprising splitting an incoming data flow between the first and second connections, wherein the data communicated over the second connection is a split portion of the incoming data flow.

4. The method of claim 3, wherein establishing the second connection further comprises establishing an interface between the medium access control protocol layers of the first and second wireless communication systems.

5. The method of claim 3, further comprising communicating, from the first wireless communication system to the second wireless communication system, a setup request for the wireless communications with the user equipment via the one or more component carriers over the second air interface of the second wireless communication system.

6. The method of claim 5, further comprising receiving, at the first wireless communication system, a response from the second wireless communication system to the setup request and the first wireless communication system forwarding the response to the user equipment.

7. The method of claim 6, wherein the response includes link configuration information to be used by the user equipment for the wireless communications to the user equipment using the one or more component carriers over the second air interface of the second wireless communication system.

8. The method of claim 3, further comprising receiving, at the first wireless communication system and over the second connection, feedback from the second wireless communication system of status of a buffer corresponding to the user equipment and used for the wireless communications with the user equipment via one or more component carriers, over the second air interface of the second wireless communication system, and splitting further comprises using the status to adjust an amount of the data sent over the second connection.

9. An apparatus, comprising:
at least one processor; and
at least one memory including computer program code,
the at least one memory and the computer program code configured to, with the at least one processor, cause the apparatus to perform at least the following:
enabling interoperability between different types of wireless communication systems operating with different types of air interfaces to provide at least downlink radio resource aggregation for a user equipment by:
establishing a first connection between a medium access control protocol layer of a first wireless communication system and a physical layer of the first wireless communication system;
establishing a second connection between the medium access control protocol layer of the first wireless communication system and a medium access control protocol layer of a second wireless communication system;
using the first connection, performing wireless communications with the user equipment via one or more component carriers over a first air interface of the first wireless communication system;
communicating data over the second connection, the data used in wireless communications via one or more component carriers over a second air interface of the second wireless communication system; and
receiving at the first wireless communication system control information from the second wireless communication system,
wherein the control information includes information of available resources for data transmission over the second air interface of the second wireless communication system.

10. The apparatus of claim 9, wherein the at least one memory and the computer program code are further configured to, with the at least one processor, cause the apparatus to perform at least the following: performing the wireless communications via the one or more component carriers over the second air interface of the second wireless communication system.

11. The apparatus of claim 10, wherein:
the apparatus comprises first and second base stations;
the first base station performs the establishing a first connection, establishing a second connection, performing wireless communications with the user equipment via one or more component carriers over a first air interface of the first wireless communication system, and communicating data over the second connection; and
the second base station performs the performing the wireless communications via the one or more component carriers over the second air interface of the second wireless communication system.

12. The apparatus of claim 11, comprising a single multi-radio base station that performs the establishing a first connection, the establishing a second connection, the performing wireless communications with the user equipment via one or more component carriers over a first air interface of the first wireless communication system, and communicating data over the second connection, and the performing the wireless communications via the one or more component carriers over the second air interface of the second wireless communication system.

13. A method, comprising:
receiving at a second wireless communication system a request for wireless communications with a user equipment, the wireless communications to take place via one or more component carriers over a second air interface of the second wireless communication system in addition to wireless communications via one or more component carriers over a first air interface of the first wireless communication system; and
transmitting control information to the first wireless communication system over an interface between the first wireless communication system and the second wireless communication system,
wherein the control information includes information of available resources for data transmission over the second air interface of the second wireless communication system.

14. The method of claim 13, further comprising performing the wireless communications to the user equipment using the one or more component carriers over the second air interface of the second wireless communication system.

15. The method of claim 13, further comprising receiving a data flow over the interface, wherein data from the data flow is used in the wireless communications to the user equipment using the one or more component carriers over the second air interface of the second wireless communication system.

16. The method of claim 15, further comprising providing feedback over the interface of status of a buffer corresponding to the user equipment.

17. The method of claim 13, wherein the link configuration information comprises at least one of a radio network transaction identifier, an indicator of quality of service, and power information for the one or more component carriers to be used in the wireless communications to the user equipment over the second air interface of the second wireless communication system.

18. The method of claim 13, further comprising receiving, from a radio network controller, an indication of at least one resource to be allocated to the wireless communication for the wireless communications to the user equipment and other user equipments using the second air interface of the second wireless communication system, and deriving at least part of the link configuration information based on the indication of the at least one resource.

19. An apparatus, comprising:
at least one processor; and
at least one memory including computer program code,
the at least one memory and the computer program code configured to, with the at least one processor, cause the apparatus to perform at least the following:
receiving a request for wireless communications with a user equipment, the wireless communications to take place via one or more component carriers over a second air interface of a second wireless communication system in addition to wireless communication via one or more component carriers over a first air interface of a first wireless communication system; and
transmitting control information to the first wireless communication system over an interface between the first wireless communication system and the second wireless communication system,
wherein the control information includes information of available resources for data transmission over the second air interface of the second wireless communication system.

20. The apparatus of claim 19, wherein the at least one memory and the computer program code are further configured to, with the at least one processor, cause the apparatus to perform at least the following: performing the wireless communications to the user equipment using the one or more component carriers over the second air interface of the second wireless communication system.

* * * * *